US008054787B2

(12) United States Patent
Chu

(10) Patent No.: US 8,054,787 B2
(45) Date of Patent: Nov. 8, 2011

(54) APPARATUS AND METHOD FOR ENHANCED ADAPTIVE CHANNEL SELECTION AND SUBFRAME ALLOCATION IN A COMMUNICATION SYSTEM

(75) Inventor: Liwen Chu, San Jose, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 1054 days.

(21) Appl. No.: 11/975,422

(22) Filed: Oct. 19, 2007

(65) Prior Publication Data

US 2008/0096573 A1 Apr. 24, 2008

Related U.S. Application Data

(60) Provisional application No. 60/853,123, filed on Oct. 20, 2006, provisional application No. 60/995,095, filed on Sep. 24, 2007.

(51) Int. Cl.
*H04W 4/00* (2009.01)
(52) U.S. Cl. ......................... 370/329; 455/450
(58) Field of Classification Search .................. None
See application file for complete search history.

(56) References Cited

U.S. PATENT DOCUMENTS

| 5,828,963 | A * | 10/1998 | Grandhi et al. ............... 455/450 |
| 6,154,654 | A * | 11/2000 | Mao ............................... 455/446 |
| 6,405,048 | B1 * | 6/2002 | Haartsen ........................ 455/464 |
| 7,149,479 | B2 * | 12/2006 | Austin et al. ............... 455/67.11 |
| 7,558,592 | B2 * | 7/2009 | Hart et al. ..................... 455/522 |
| 2006/0246917 | A1 * | 11/2006 | Jin et al. ........................ 455/450 |

OTHER PUBLICATIONS

Wendong Hu et al., "Connection Based Over-the-air Inter Base Station Communications: Logical Control Connection and its Application to Credit Token based Rental Protocol," STMicroelectronics, Jul. 2006, 17 pages.
"Draft Standard for Wireless Regional Area Networks Part 22: Cognitive Wireless RAN Medium Access Control (MAC) and Physical Layer (PHY) specifications: Policies and procedures for operation in the TV Bands," IEEE May 2006, 304 pages.
"Local and metropolitan area networks, Part 16: Air Interface for Fixed and Mobile Broadband Wireless Access Systems, Amendment for Improved Coexistence Mechanisms for License-Exempt Operation," IEEE Aug. 2006, 172 pages.

* cited by examiner

*Primary Examiner* — Anh-Vu Ly
(74) *Attorney, Agent, or Firm* — Lisa K. Jorgenson; William A. Munck

(57) ABSTRACT

A first base station is adjacent to one or more second base stations, and the second base stations are adjacent to one or more third base stations. One or more frequency channels or subframes used by the third base stations are identified by the second base stations, which notify the first base station of the frequency channels or subframes used by the third base stations. The second base stations also notify the first base station of the frequency channels or subframes used by the second base stations. The first base station selects a working frequency channel or subframe based on this information. For example, the first base station may ignore any frequency channels or subframes used by the adjacent second base stations. The first base station may also give priority to the frequency channels or subframes used by the non-adjacent third base stations.

15 Claims, 3 Drawing Sheets

APPARATUS AND METHOD FOR ENHANCED ADAPTIVE CHANNEL SELECTION AND SUBFRAME ALLOCATION IN A COMMUNICATION SYSTEM

CROSS-REFERENCE TO RELATED APPLICATIONS

This application claims priority under 35 U.S.C. §119(e) to:

U.S. Provisional Patent Application No. 60/853,123 filed on Oct. 20, 2006; and

U.S. Provisional Patent Application No. 60/995,095 filed on Sep. 24, 2007.

Both of these applications are hereby incorporated by reference.

TECHNICAL FIELD

This disclosure is generally directed to communication systems and more specifically to an apparatus and method for enhanced adaptive channel selection and subframe allocation in a communication system.

BACKGROUND

Many different types of wireless communication systems include base stations or access points. The base stations or access points typically include components for wirelessly transmitting and receiving information. The base stations or access points typically interact with wireless devices (such as mobile telephones and computing devices) to provide wireless services (such as wireless voice and data services) to the wireless devices. In this document, the phrase "base station" and its derivatives may collectively refer to base stations, access points, and other similar structures.

Wireless communication systems routinely engage in channel selection, where a base station selects a wireless frequency channel for use in communicating with wireless devices. Wireless communication systems also routinely engage in subframe allocation, where a base station selects a particular subframe in a frequency channel for use in communicating with the wireless devices. For example, a base station may monitor the interference present on each of multiple frequency channels and select the frequency channel that has a lower amount of interference. A base station may also monitor the amount of use of multiple frequency channels and select the frequency channel that is used less. Similar operations could be used to select a particular subframe in a frequency channel. In this document, the phrase "frequency channel" may be used to refer to an individual frequency or a range of frequencies, and the term "subframe" may be used to refer to a time period during which a frequency channel is used to transmit or receive data.

SUMMARY

This disclosure provides an apparatus and method for enhanced adaptive channel selection and subframe allocation in a communication system.

In a first embodiment, a method includes receiving information associated with a plurality of frequency channels or subframes. The method also includes selecting one of the frequency channels or subframes for use by a first base station. One or more of the frequency channels or subframes are used by one or more second base stations and are given priority during the selection. The one or more second base stations are non-adjacent to the first base station.

In particular embodiments, the one or more second base stations are adjacent to one or more third base stations, and the one or more third base stations are adjacent to the first base station. For example, an interference contour of each second base station may overlap an interference contour of at least one third base station, and the interference contour of each third base station may overlap an interference contour of the first base station.

In other particular embodiments, the receiving and selecting occur at the first base station. Also, receiving the information includes receiving, from the one or more third base stations, information associated with the one or more frequency channels or subframes used by the one or more second base stations.

In yet other particular embodiments, selecting one of the frequency channels or subframes includes (i) determining if any of the one or more frequency channels or subframes used by the one or more second base stations is acceptable and (ii) selecting one of the acceptable frequency channels or subframes. Multiple frequency channels or subframes used by the one or more second base stations could be acceptable, and selecting one of the frequency channels or subframes may include randomly selecting one of the multiple frequency channels or subframes.

In still other particular embodiments, selecting one of the frequency channels or subframes includes selecting one of the frequency channels or subframes that is not used by the one or more second base stations, when none of the one or more frequency channels or subframes used by the one or more second base stations are acceptable. Multiple frequency channels or subframes that are not used by the one or more second base stations may be acceptable, and selecting one of the frequency channels or subframes may include randomly selecting one of the multiple frequency channels or subframes.

In additional particular embodiments, receiving the information includes receiving information associated with the frequency channels and the subframes. Also, selecting one of the frequency channels or subframes includes selecting one of the frequency channels and one of the subframes for use by the first base station. One or more of the frequency channels used by the one or more second base stations are given priority, and one or more of the subframes used by the one or more second base stations are given priority.

In a second embodiment, an apparatus includes a memory configured to store information associated with a plurality of frequency channels or subframes. The apparatus also includes a controller configured to select one of the frequency channels or subframes for use by a first base station. The controller is configured to give priority to one or more of the frequency channels or subframes that are used by one or more second base stations when selecting one of the frequency channels or subframes. The one or more second base stations are non-adjacent to the first base station.

In a third embodiment, a computer program is embodied on a computer readable medium. The computer program includes computer readable program code for receiving information associated with a plurality of frequency channels or subframes. The computer program also includes computer readable program code for selecting one of the frequency channels or subframes for use by a first base station. One or more of the frequency channels or subframes are used by one or more second base stations and are given priority during the selection. The one or more second base stations are non-adjacent to the first base station.

In a fourth embodiment, a method includes identifying information associated with one or more frequency channels or subframes used by one or more first base stations at a second base station. The second base station is adjacent to the one or more first base stations. The method also includes identifying information associated with a frequency channel or subframe used by the second base station. In addition, the method includes transmitting, to a third base station, the information associated with the one or more frequency channels or subframes used by the one or more first base stations and the information associated with the frequency channel or subframe used by the second base station.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 4, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
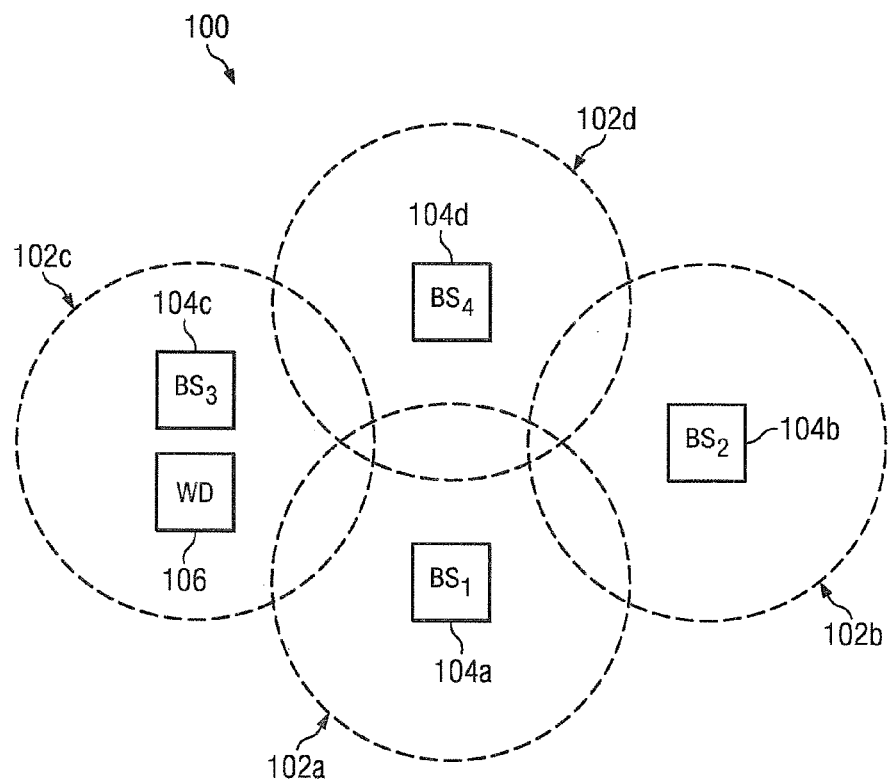
FIG. 1 illustrates an example communication system according to this disclosure.

FIG. 1 illustrates an example communication system 100 according to this disclosure. The embodiment of the system 100 shown in FIG. 1 is for illustration only. Other embodiments of the system 100 could be used without departing from the scope of this disclosure.

As shown in FIG. 1, the system 100 includes multiple cell sites 102a-102d. The cell sites 102a-102d include base stations 104a-104d, respectively. The cell sites 102a-102d generally represent areas where one or more wireless devices 106 may receive wireless service. For example, the cell sites 102a-102d may include areas where wireless devices 106 may receive wireless voice and data services. In some embodiments, each of the cell sites 102a-102d is associated with a particular wireless frequency channel and/or a particular subframe. In this example, the dashed line around each of the cell sites 102a-102d may represent an interference contour, which defines the area in which a cell site may cause interference on the wireless frequency channel or subframe used by the cell site. While shown as being circular in FIG. 1, each of the cell sites 102a-102d may have any suitable interference contour.

Figure 2:
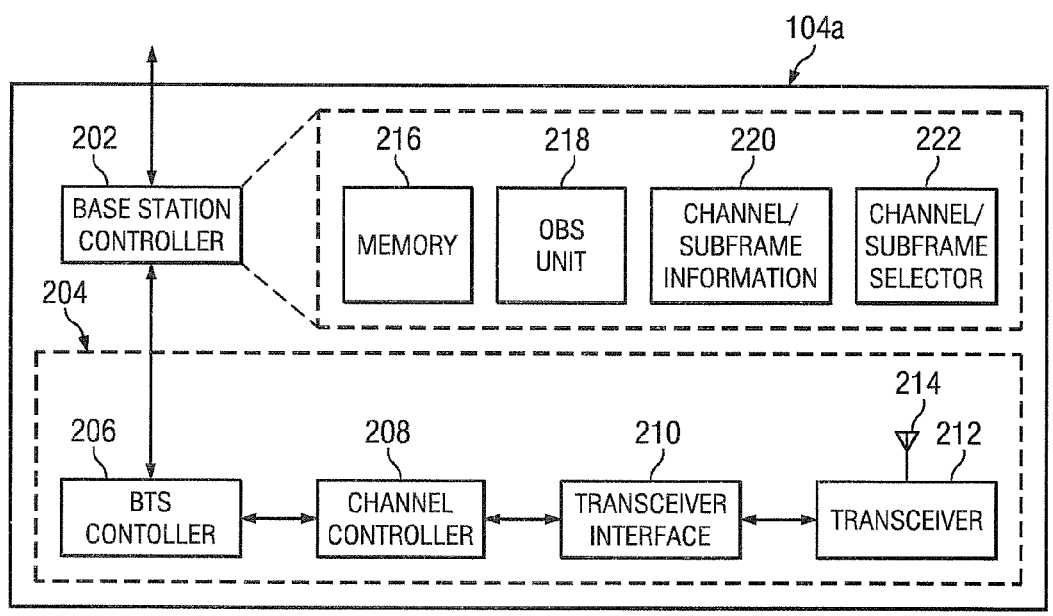
FIG. 2 illustrates an example base station according to this disclosure.

Each of the base stations 104a-104d communicates with one or more wireless devices 106 over a wireless medium, such as by using radio frequency (RF) or other wireless technology. For example, the base stations 104a-104d may transmit and receive wireless signals containing voice, data, and/or control signals to and from the wireless devices 106. In some embodiments, each of the base stations 104a-104d communicates using a particular wireless frequency channel and/or a particular subframe. Each of the base stations 104a-104d includes any suitable structure for communicating wirelessly with one or more wireless devices, such as cellular base stations and wireless access points. One example embodiment of a base station is shown in FIG. 2, which is described below. In this example, while the base stations 104a-104d reside at the centers of the cell sites 102a-102d, each of the base stations 104a-104d could reside at any suitable position within its cell site.

The base stations 104a-104d and the wireless devices 106 may use any suitable wireless technology. For example, the base stations 104a-104d and the wireless devices 106 may use radio frequency (RF) signals to communicate. As particular examples, the base stations 104a-104d and the wireless devices 106 may support the IEEE 802.16, 802.22, or other standard(s) for wireless communications.

In this example, various ones of the base stations 104a-104d have overlapping interference contours. Base stations with overlapping interference contours can cause interference in each other's cell site if the base stations use the same working frequency channel or subframe. As a particular example, the base station 104a in FIG. 1 has an interference contour that overlaps the interference contours of all other base stations 104b-104d. As a result, the base station 104a could interfere with the operation of any other base station 104b-104d in FIG. 1 if the base station 104a uses the same working frequency channel or subframe as the other base station 104b-104d. Similarly, the base station 104b could interfere with the operation of the base station 104a or 104d if the base station 104b uses the same working frequency channel or subframe as the base station 104a or 104d. However, the base stations 104b and 104c do not have overlapping interference contours, so those base stations 104b and 104c could use the same working frequency channel or subframe without interfering with each other (at least to a significant extent). In this document, the phrase "working frequency channel" generally denotes the frequency channel used by a base station to communicate wirelessly with one or more wireless devices. Similarly, in this document, the phrase "working subframe" generally denotes the subframe used by a base station to communicate wirelessly with one or more wireless devices.

As described in more detail below, one or more of the base stations 104a-104d may perform enhanced adaptive channel selection and/or enhanced adaptive subframe allocation. Adaptive channel selection refers to a process where a base station or other component can adaptively select a working frequency channel for the base station. As an example, a base station could operate using a first working frequency channel. The base station may monitor other frequency channels and identify any other frequency channels that are less used or that have less interference compared to the current working channel. This allows the base station to potentially identify better frequency channels for use. As another example, when a base station is first initialized in the communication system 100, the base station typically monitors the frequency channels and identifies a frequency channel that is available for use (if any). Adaptive subframe allocation refers to a process where a base station or other component can adaptively select a working subframe for the base station.

Conventional systems may use a random approach to channel selection and subframe allocation. In other words, a base station may identify available frequency channels or subframes and then randomly select one of the available frequency channels or subframes for use. This may, however, lead to inefficient use of the frequency spectrum. In the following description, the phrase "operating base station" is used to denote a base station using a working frequency channel and/or a working subframe. Also, the phrase "initializing base station" is used to denote a base station attempting to select a working frequency channel and/or a working subframe.

Assume in FIG. 1 that three frequency channels are available for use. Also assume that the base stations 104a-104b are operating base stations, where the base station 104a uses the first frequency channel and the base station 104b uses the second frequency channel. The base station 104c may represent an initializing base station that has the option of using the second frequency channel or the third frequency channel (since no other base stations with overlapping interference contours use these frequency channels). In conventional systems, the base station 104c could randomly select between the second and third frequency channels. If the base station 104c selects the third frequency channel, all three frequency channels are used by the base stations 104a-104c (where all three are now operating base stations). If the base station 104d initializes and attempts to join the communication system 100, the base station 104d cannot find an acceptable frequency channel. This is because all three frequency channels are in use by the three operating base stations 104a-104c, and the initializing base station 104d has an interference contour that overlaps the interference contours of the operating base stations 104a-104c. The initializing base station 104d therefore cannot identify a frequency channel that can be used to provide service. In a similar manner, there could be a single frequency channel with three different subframes available for use. The operating base stations 104a-104c could randomly select and begin using all three available subframes, and the base station 104d would not be able to find an acceptable subframe for use.

In accordance with this disclosure, a base station can monitor its own working channel or subframe and the working channel(s) or subframe(s) of one or more neighboring base stations. The monitoring base station may then make this information available to other components (such as an initializing base station), which can use the information to more efficiently select a working channel or subframe. For example, the base station 104a may monitor its own working channel (the first channel in the above example) and the working channel of its neighboring base station 104b (the second channel in the above example). The base station 104a may also receive the working channel or subframe of its neighboring base station 104b through messages received from the base station 104b. The base station 104a may then make this information (the working channels or subframes for itself and its adjacent neighbors) available to an initializing base station, such as the base station 104c. The initializing base station 104c may use this information and determine that the working channel of the operating base station 104b is acceptable for use by the base station 104c (since the interference contours of the base stations 104b-104c do not overlap). The base station 104c can then select the working channel of the base station 104b as its own working channel (thus making the base station 104c an operating base station). This leaves the third frequency channel in the above example available for use by other base station(s), such as the base station 104d. A similar process could be used to allow operating base stations to more efficiently select subframes for use, which may leave other subframes available for use by other base station(s).

In this way, the base stations may more efficiently select working frequency channels during adaptive channel selection and/or working subframes during adaptive subframe allocation, enhancing the adaptive channel selection and adaptive subframe allocation processes. Among other things, this may allow more efficient use of fewer frequency channels, more efficient use of fewer subframes, and/or more efficient use of a larger number of base stations in the system 100.

Although FIG. 1 illustrates one example of a communication system 100, various changes may be made to FIG. 1. For example, the system 100 could include any number of cell sites, base stations, and wireless devices. Also, the system 100 could be connected to any suitable network(s), such as another wireless network or a data network. Further, while the enhanced adaptive channel selection and subframe allocation processes have been described as being performed by the base stations 104a-104d, these processes could be performed at least partially by other components, such as a control system. Beyond that, the system 100 could implement the enhanced adaptive channel selection process without implementing the enhanced adaptive subframe allocation process (or vice versa). In addition, FIG. 1 illustrates one example operational environment in which enhanced adaptive channel selection and subframe allocation may be used. This functionality could be used in any other communication system.

FIG. 2 illustrates an example base station 104a according to this disclosure. The embodiment of the base station 104a shown in FIG. 2 is for illustration only. Other embodiments of the base station 104a could be used without departing from the scope of this disclosure. Also, for ease of explanation, the base station 104a of FIG. 2 is described with respect to the system 100 of FIG. 1. The base station 104a of FIG. 2 could be used with any other suitable system.

As shown in FIG. 2, the base station 104a includes a base station controller 202 and one or more base transceiver subsystems 204. The base station controller 202 generally controls the overall operation of the base station 104a. The base station controller 202 could, for example, control wireless communication resources in the base station 104a, such as the base transceiver subsystems 204. The base station controller 202 includes any hardware, software, firmware, or combination thereof for controlling a base station.

Each base transceiver subsystem 204 generally includes components used for wireless communications to and from the base station 104a. In this example, each base transceiver subsystem 204 includes a base transceiver subsystem (BTS) controller 206, a channel controller 208, a transceiver interface 210, a transceiver 212, and an antenna 214. The BTS controller 206 generally controls the base transceiver subsystem 204 and communicates with the base station controller 202. The BTS controller 206 includes any hardware, software, firmware, or combination thereof for controlling a base transceiver subsystem.

During wireless communications, the channel controller 208 generally controls communication channels for communicating with wireless devices, such as forward (outbound) and reverse (inbound) channels. The channel controller 208 includes any hardware, software, firmware, or combination thereof for controlling communication channels in a base transceiver subsystem.

The transceiver interface 210 acts as an interface between the communication channels and the transceiver 212. The transceiver interface 210 includes any suitable structure providing an interface to a transceiver. The transceiver 212 includes any suitable structure supporting wireless transmission of outbound signals and wireless reception of inbound signals, such as an RF transceiver. As a particular example, the transceiver 212 could include amplifiers, filters, and analog-to-digital converters for processing inbound signals and amplifiers, filters, and digital-to-analog converters for processing outbound signals. The antenna 214 represents any suitable structure for transmitting and receiving wireless signals, such as an RF antenna or antenna array.

In this example, the base station controller 202 includes or supports various components or functions for enhanced adaptive channel selection and/or enhanced adaptive subframe allocation. For example, the base station controller 202 includes or has access to a memory 216, which can be used to store instructions or data used, generated, or collected by the base station controller 202. The memory 216 includes any suitable volatile and/or non-volatile storage and retrieval device or devices.

The base station controller 202 also includes or has access to an operating base station (OBS) unit 218. The operating base station unit 218 determines various information about neighboring base stations, such as base stations with interference contours that overlap the interference contour of the base station 104a. As a particular example, the operating base station unit 218 may identify the working channels and/or working subframes currently used by any neighboring operating base stations. The operating base station unit 218 may then make this information available for use by other components in the base station 104a, such as by storing the information in the memory 216. As described below, the operating base station unit 218 may also make at least some of this information available for use by other base stations, such as any of the base stations 104b-104d in FIG. 1. The operating base station unit 218 includes any hardware, software, firmware, or combination thereof for identifying and providing channel and/or subframe information associated with one or more other base stations.

The base station controller 202 further includes or has access to channel/subframe information 220. The channel/subframe information 220 includes information identifying the working channel and/or working subframe currently used by the base station 104a. The channel/subframe information 220 also includes information identifying the working channel(s) and/or subframe(s) currently used by neighboring base station(s). The channel/subframe information 220 may further include information identifying all of the frequency channels and/or subframes that could be used by the base station 104a, such as an identification of all frequency channels and subframes in the system 100. In addition, the channel/subframe information 220 could include information associated with those frequency channels or subframes, such as an amount of interference associated with each or a subset of the frequency channels or subframes. Among other things, the channel/subframe information 220 could be used during enhanced adaptive channel selection and subframe allocation. The channel/subframe information 220 could be stored in any suitable location(s), such as in the memory 216.

In addition, the base station controller 202 includes or has access to a channel/subframe selector 222. The channel/subframe selector 222 supports the selection of a working channel and/or a working subframe for the base station 104a. For example, when the base station 104a is initialized (or at any other suitable time), the channel/subframe selector 222 may examine the channel/subframe information 220 and determine if any interference-free or other acceptable frequency channels or subframes are available for use. If so, the channel/subframe selector 222 can select a channel for use as the working channel of the base station 104a and/or a subframe for use as the working subframe of the base station 104a.

As described in more detail below, when selecting a working channel or subframe for the base station 104a, the channel/subframe selector 222 could give priority to the working channels or subframes used by "two-hop" base stations, where those working channels or subframes have been identified or forwarded by "one-hop" base stations. From the perspective of a particular base station, the phrase "one-hop base station" denotes an adjacent base station, such as a base station having an overlapping interference contour. For example, the base station 104a in FIG. 1 is viewed as a "one-hop" base station from the perspective of the base station 104c. From the perspective of a particular base station, the phrase "two-hop base station" denotes a base station that is adjacent to a one-hop base station. For instance, the base station 104b in FIG. 1 is viewed as a "two-hop" base station from the perspective of the base station 104c (since the base station 104b is adjacent to the base station 104a, which is adjacent to the base station 104c). In addition, the phrase "adjacent base stations" refers to base stations that having overlapping or near-overlapping interference contours, that are located closer together compared to other base stations, or that are otherwise located in proximity to one another. In other words, when selecting a working channel or subframe for the base station 104a, the channel/subframe selector 222 could give priority to channels or subframes used by non-adjacent operating base stations.

In the example given above, the channel/subframe selector 222 in the base station 104c has the choice between the second and third frequency channels (since the first channel is used by the base station 104a). The second frequency channel is used by the base station 104b, but it may still be acceptable for use by the base station 104c since the base stations 104b-104c do not have overlapping interference contours. Also, since the base station 104b is a two-hop base station from the perspective of the base station 104c, the channel/subframe selector 222 in the base station 104c could give priority to the second frequency channel over other available frequency channels (such as the third channel). As a result, the base station 104c may select the second frequency channel, allowing the third frequency channel to remain free for use (such as by the base station 104d). In a similar manner, the channel/subframe selector 222 in the base station 104c could give priority to the subframe used by the base station 104b over other available subframes. This may allow more subframes to remain free for use by other base stations (such as by the base station 104d). The channel/subframe selector 222 includes any hardware, software, firmware, or combination thereof for selecting a working channel and/or a working subframe for a base station.

As noted above, the operating base station unit 218 in the base station 104a may make channel/subframe information available for use by other base stations 104b-104d. For example, the base station 104a may represent a one-hop base station from the perspective of each base station 104b-104d in FIG. 1. The operating base station unit 218 in the base station 104a may therefore make channel/subframe information regarding its adjacent base stations available to the base stations 104b-104d. From the perspective of the base station receiving it, the information from the base station 104a appears to be associated with two-hop base stations. For instance, the operating base station unit 218 in the base station 104a could make channel/subframe information associated with the base station 104b available to the base station 104c, where the base station 104b appears as a two-hop base station from the perspective of the base station 104c. By doing this, the base station 104a allows the base station 104c to select the working channel or subframe of a two-hop base station (base station 104*b*) as its working channel or subframe.

Although FIG. 2 illustrates one example of a base station 104*a*, various changes may be made to FIG. 2. For example, the functional division shown in FIG. 2 is for illustration only. Various components in FIG. 2 could be combined or omitted and additional components could be added according to particular needs. Also, various components or functions shown as residing within the base station 104*a* could reside in other components, such as within an external control system. Further, various components or functions shown as residing within one part of the base station 104*a* could reside in other part(s) of the base station 104*a*, such as when the components used for enhanced adaptive channel selection or subframe allocation reside in a base transceiver subsystem 204 instead of the base station controller 202. Beyond that, the base station 104*a* could implement the enhanced adaptive channel selection process without implementing the enhanced adaptive subframe allocation process (or vice versa). In addition, FIG. 2 illustrates one example base station capable of performing enhanced adaptive channel selection and subframe allocation. This functionality could be used in any other device.

Figure 3:
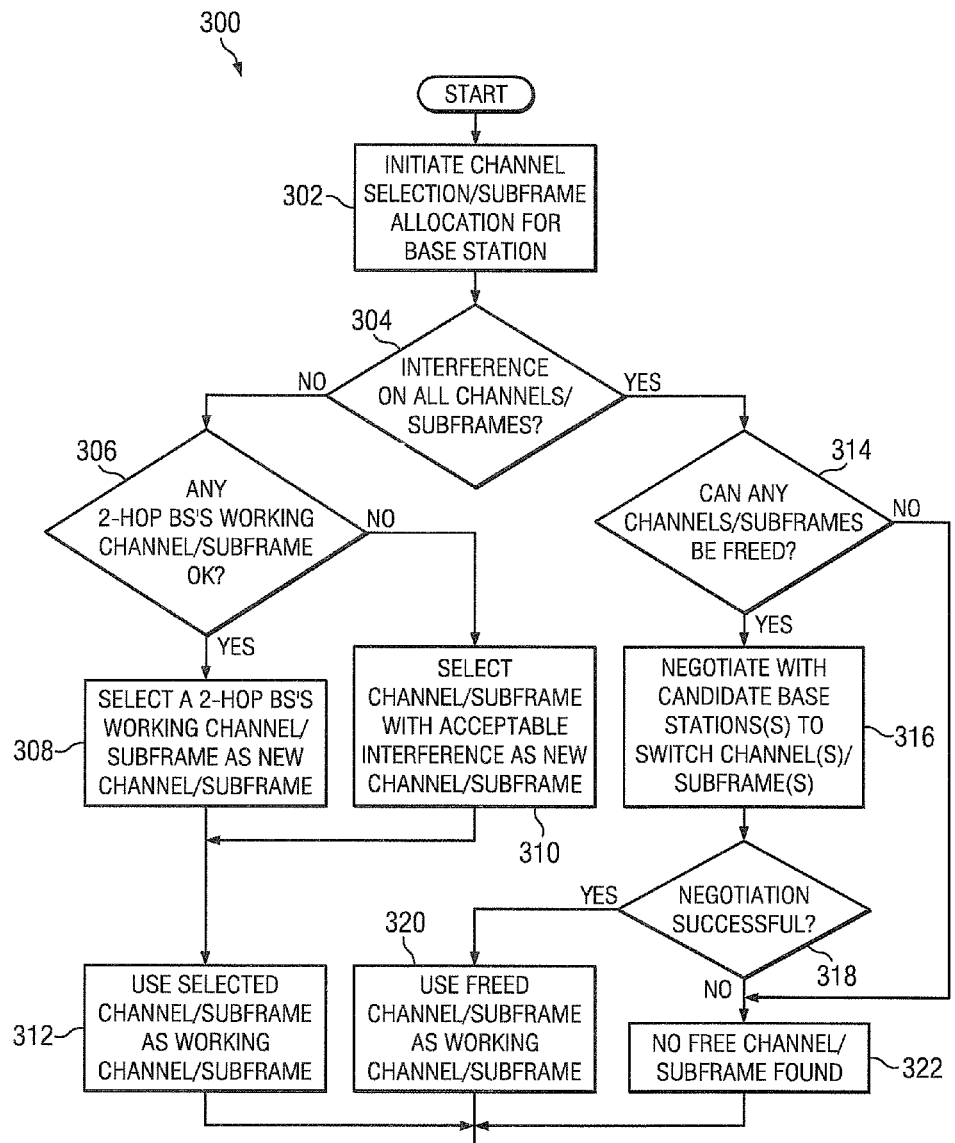
FIG. 3 illustrates an example method for enhanced adaptive channel selection and subframe allocation in a communication system according to this disclosure.

FIG. 3 illustrates an example method 300 for enhanced adaptive channel selection and subframe allocation in a communication system according to this disclosure. The embodiment of the method 300 shown in FIG. 3 is for illustration only. Other embodiments of the method 300 could be used without departing from the scope of this disclosure. Also, for ease of explanation, the method 300 in FIG. 3 is described with respect to the base station 104*b* operating in the system 100 of FIG 1. The method 300 could be used with any suitable device and in any suitable system.

Channel selection or subframe allocation for the base station 104*b* is initiated at step 302. This could include, for example, the base station 104*b* being initialized in the communication system 100. This could also include the base station 104*b* operating with a current working channel or subframe and determining that an amount of interference on the current channel or subframe is or is becoming unacceptable. Channel selection or subframe allocation could be initiated in response to any other or additional events.

The base station 104*b* determines whether interference exists on all possible frequency channels or subframes at step 304. This could include, for example, the base station controller 202 tuning the one or more base transceiver subsystems 204 to the appropriate channels or subframes and determining an amount of interference on each channel or subframe. This could also include the base station controller 202 using information stored in the memory 216 (such as the channel/subframe information 220) to determine a level of recent interference on one or more channels or subframes. This could further include the wireless devices 106 associated with the base station 104*b* sensing the appropriate channels/subframes, determining an amount of interference on each channel/subframe, and reporting the sensing results to the base station 104*b*.

If at least one channel or subframe is not suffering from interference, the base station 104*b* determines whether the working channel or subframe of any two-hop base station is acceptable at step 306. This may include, for example, the channel/subframe selector 222 in the base station 104*b* examining information about any two-hop base stations. The two-hop base stations can be identified at the base station 104*b* using information from one-hop base stations that are adjacent to the base station 104*b* (such as the base stations 104*a* and 104*d*). The information about the two-hop base stations can be received in any suitable manner, such as in the form of a coexistence protocol message sent from the one-hop base stations to the base station 104*b*. Also, the determination of whether a two-hop base station's working channel or subframe is acceptable could involve any suitable test(s), such as whether an amount of interference exceeds a threshold.

If the working channel or subframe of any two-hop base station is acceptable, the base station 104*b* selects one of those channels or subframe as its own working channel or subframe at step 308. This may include, for example, the channel/subframe selector 222 in the base station 104*b* selecting a new working channel or subframe from a list of acceptable working channels or subframes associated with the two-hop neighbors of the base station 104*b*. If more than one channel or subframe exists in the list, the channel/subframe selector 222 could select one in any suitable manner, such as by randomly selecting a channel or subframe in the list.

Otherwise, if no working channel or subframe of any two-hop base station is acceptable, the base station 104*b* selects any channel or subframe with acceptable interference as its own working channel or subframe at step 310. This may include, for example, the channel/subframe selector 222 in the base station 104*b* selecting a new working channel or subframe from a list of channels or subframes having no interference or other acceptable amount of interference. As shown in steps 308-310, the channel/subframe selector 222 in the base station 104*b* gives priority or preference to working channels or subframes associated with two-hop base stations when selecting a working channel or subframe for the base station 104*b*. In either case, the base station 104*b* finds a free channel or subframe and can use the free channel or subframe as its new working channel or subframe at step 312.

If all channels or subframes are suffering from interference at step 304, the base station 104*b* determines if any channels or subframes can be freed at step 314. This may include, for example, the channel/subframe selector 222 in the base station 104*b* determining whether an optimized distribution of channels or subframes can free a channel or subframe for use by the base station 104*b*. If it is possible to free a channel or subframe, the base station 104*b* engages in negotiations with one or more candidate base stations at step 316, where the candidate base stations represent base stations that may change their working channels or subframes in order to provide a more efficient channel or subframe assignment (which may free a channel or subframe for the base station 104*b*). If the negotiations are successful at step 318, the base station 104*b* has found a free channel or subframe (the channel or subframe freed by the negotiations), and the base station 104*b* can use the freed channel or subframe as its new working channel or subframe at step 320. Otherwise, if no channels or subframes can be freed at step 314 or the negotiations are not successful at step 318, the base station 104*b* finds no free channels or subframes at step 322. At this point, the base station 104*b* cannot operate using a working channel or subframe, and any suitable actions may occur (such as notifying a user). Mechanisms for determining an optimized distribution of frequency channels or subframes and for negotiating channel or subframe assignments to free a channel or subframe are disclosed in a draft amendment to the IEEE 802.16 standard (denoted 802.16h) titled "Improved Coexistence Mechanisms for License-Exempt Operation," which is hereby incorporated by reference.

Although FIG. 3 illustrates one example of a method 300 for enhanced adaptive channel selection and subframe allocation in a communication system, various changes may be made to FIG. 3. For example, while shown as a series of steps, various steps in FIG. 3 could overlap, occur in a different order, or occur multiple times. Also, while FIG. 3 have been described as being performed by the base station 104b, various steps in FIG. 3 could be performed by other components, such as a control system or other component in the system 100. In addition, the method 300 could be performed once or multiple times and could be used to select a frequency channel, a subframe, or both for a base station.

Figure 4:
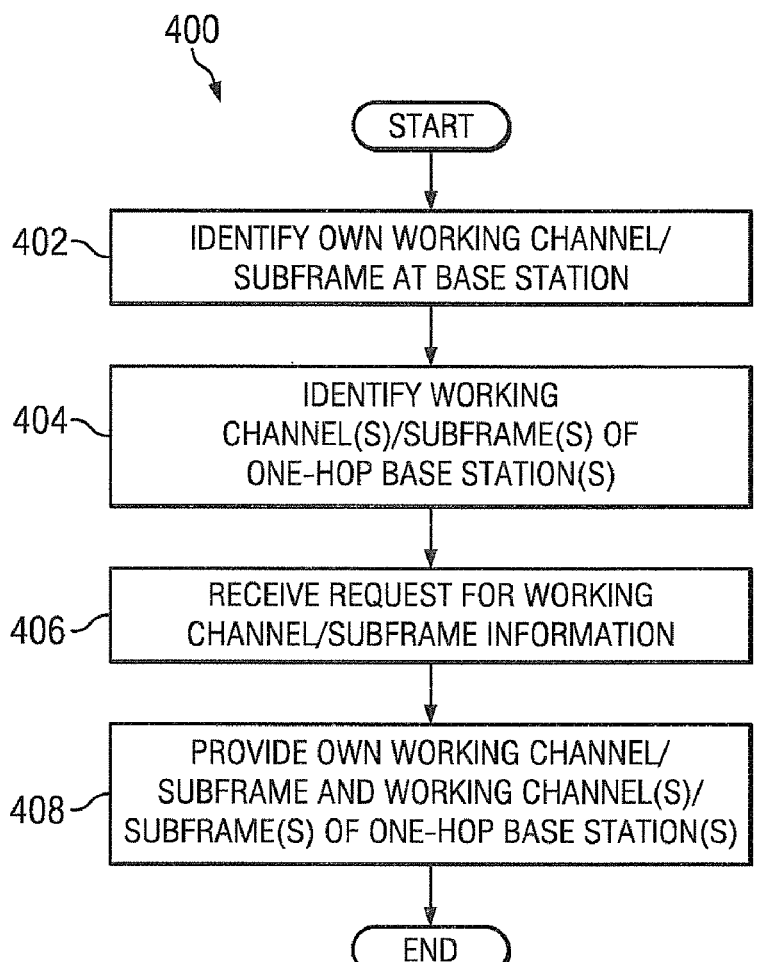
FIG. 4 illustrates an example method for reporting working channel and subframe information to support enhanced adaptive channel selection and subframe allocation in a communication system according to this disclosure.

FIG. 4 illustrates an example method for reporting working channel and subframe information to support enhanced adaptive channel selection and subframe allocation in a communication system according to this disclosure. The embodiment of the method 400 shown in FIG. 4 is for illustration only. Other embodiments of the method 400 could be used without departing from the scope of this disclosure. Also, for ease of explanation, the method 400 in FIG. 4 is described with respect to the base station 104a operating in the system 100 of FIG. 1. The method 400 could be used with any suitable device and in any suitable system.

The base station 104a identifies its own working channel or subframe at step 402. This may include, for example, the operating base station unit 218 in the base station 104a identifying the channel or subframe currently being used by the base station 104a. The channel or subframe currently being used by the base station 104a may have been previously selected by the channel/subframe selector 222.

The base station 104a identifies the working channel or subframe of any neighboring one-hop base stations at step 404. This could include, for example, the operating base station unit 218 in the base station 104a identifying the working channel or subframe of a base station that is adjacent to the base station 104a, such as a base station with an overlapping interference contour. One example mechanism for identifying the working channel of a neighboring base station is disclosed in U.S. patent application Ser. No. 11/974,119 filed on Oct. 11, 2007, which is hereby incorporated by reference. In general, this technique involves a wireless device 106 (such as customer premises equipment or "CPE") served by one base station identifying the working channel of another base station, where the wireless device is located in an area where the interference contours of the base stations overlap. The same or similar technique could be used to identify the working subframe of a neighboring base station. Another example mechanism for identifying the working channel or subframe of a neighboring base station involves a base station sends its working channel/subframe information to its "one-hop" neighboring base stations.

The base station 104a receives a request for the working channel or subframe information at step 406. This could include, for example, the operating base station unit 218 in the base station 104a receiving a request from another base station (such as the base station 104c). The request could be received directly from the other base station or indirectly, such as through a wireless device 106, backhaul IP network, or other component or system.

In response to the request, the base station 104a provides its own working channel or subframe and the working channel or subframe of any one-hop base stations at step 408. This could include, for example, the operating base station unit 218 in the base station 104a retrieving the appropriate channel/subframe information 220 from the memory 216 and transmitting that information to the requesting base station. The information transmitted to the requesting base station may or may not include the channel or subframe information associated with the requesting base station. For instance, the base station 104a could identify channel or subframe information for the base stations 104b-104c and provide the channel or subframe information for the base station 104b to the base station 104c (there may be no need to provide the channel or subframe information for the base station 104c to the base station 104c). The information could be transmitted directly to the requesting base station or indirectly, such as through a wireless device 106, backhaul IP network, or other component or system.

This may allow the requesting base station or other component to receive information associated with two-hop base stations (from the perspective of the requesting base station). The information may then be used by the requesting base station or other component during channel or subframe selection, such as to give priority to working channels or subframes used by the two-hop base stations.

Although FIG. 4 illustrates one example of a method 400 for reporting working channel and subframe information to support enhanced adaptive channel selection and subframe allocation in a communication system, various changes may be made to FIG. 4. For example, while shown as a series of steps, various steps in FIG. 4 could overlap, occur in a different order, or occur multiple times. Also, while FIG. 4 has been described as being performed by the base station 104a, various steps in FIG. 4 could be performed by other components, such as a control system or other component in the system 100. In addition, the method 400 could be performed once or multiple times and could be used to provide information associated with frequency channels, subframes, or both.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video/versatile disc (DVD), or any other type of memory. Example computer readable mediums can be randomly accessed, volatile, non-volatile, removable, or non-removable. A computer readable medium could be provided from within a system or device, or the computer readable medium can be provided external to a system or device, as well.

It may be advantageous to set forth definitions of certain words and phrases that have been used within this patent document. The term "couple" and its derivatives refer to any direct or indirect communication between two or more components, whether or not those components are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this invention. Other changes, substitutions, and alterations are also possible without departing from the spirit and scope of this invention as defined by the following claims.

What is claimed is:

1. A method comprising:
   receiving by a first base station information associated with a plurality of frequency channels or subframes from one or more second base stations; and
   selecting one of the frequency channels or subframes for use by the first base station, wherein one or more of the frequency channels or subframes are used by the one or more second base stations and are given priority during the selection, the one or more second base stations non-adjacent to the first base station,
   wherein selecting one of the frequency channels or subframes comprises:
      determining if any of the one or more frequency channels or subframes used by the one or more second base stations is acceptable;
      selecting one of the acceptable frequency channels or subframes when at least one of the one or more frequency channels or subframes used by the one or more second base stations is acceptable; and
      selecting one of the frequency channels or subframes that is not used by the one or more second base stations, when none of the one or more frequency channels or subframes used by the one or more second base stations are acceptable.

2. The method of claim 1, wherein the one or more second base stations are adjacent to one or more third base stations, and the one or more third base stations are adjacent to the first base station.

3. The method of claim 2, wherein:
   an interference contour of each second base station overlaps an interference contour of at least one third base station; and
   the interference contour of each third base station overlaps an interference contour of the first base station.

4. The method of claim 2, wherein:
   the receiving and selecting occur at the first base station; and
   receiving the information comprises receiving, from the one or more third base stations, information associated with the one or more frequency channels or subframes used by the one or more second base stations.

5. The method of claim 1, wherein:
   multiple frequency channels or subframes used by the one or more second base stations are acceptable; and
   selecting one of the frequency channels or subframes comprises randomly selecting one of the multiple frequency channels or subframes.

6. The method of claim 1, wherein:
   multiple frequency channels or subframes that are not used by the one or more second base stations are acceptable; and
   selecting one of the frequency channels or subframes comprises randomly selecting one of the multiple frequency channels or subframes.

7. The method of claim 1, wherein:
   receiving the information comprises receiving information associated with the frequency channels and the subframes; and
   selecting one of the frequency channels or subframes comprises selecting one of the frequency channels and one of the subframes for use by the first base station, wherein one or more of the frequency channels used by the one or more second base stations are given priority and one or more of the subframes used by the one or more second base stations are given priority.

8. An apparatus comprising:
   a memory configured to store at a first base station information associated with a plurality of frequency channels or subframes, the information received from one or more second base stations; and
   a firmware controller configured to select one of the frequency channels or subframes for use by the first base station, the controller configured to give priority to one or more of the frequency channels or subframes that are used by the one or more second base stations when selecting one of the frequency channels or subframes, the one or more second base stations non-adjacent to the first base station,
   wherein the controller is configured to select one of the frequency channels or subframes by:
      determining if any of the one or more frequency channels or subframes used by the one or more second base stations is acceptable;
      selecting one of the acceptable frequency channels or subframes, when at least one of the one or more frequency channels or subframes used by the one or more second base stations is acceptable; and
      selecting one of the frequency channels or subframes that is not used by the one or more second base stations, when none of the one or more frequency channels or subframes used by the one or more second base stations are acceptable.

9. The apparatus of claim 8, wherein the one or more second base stations are adjacent to one or more third base stations, and the one or more third base stations are adjacent to the first base station.

10. The apparatus of claim 9, wherein:
    an interference contour of each second base station overlaps an interference contour of at least one third base station; and
    the interference contour of each third base station overlaps an interference contour of the first base station.

11. The apparatus of claim 9, wherein the memory and the controller form a portion of the first base station.

12. The apparatus of claim 11, further comprising:
    a transceiver configured to receive at least some of the information associated with the frequency channels or subframes from the one or more third base stations, the received information associated with the one or more frequency channels or subframes used by the one or more second base stations.

13. The apparatus of claim 8, wherein:
    multiple frequency channels or subframes used by the one or more second base stations are acceptable; and
    the controller is configured to randomly select one of the multiple frequency channels or subframes.

14. The apparatus of claim 8, wherein:
    multiple frequency channels or subframes that are not used by the one or more second base stations are acceptable; and
    the controller is configured to randomly select one of the multiple frequency channels or subframes.

15. A non-transitory computer readable medium embodied with computer executable instructions to be executed by a computer, the computer readable medium comprising computer readable program code for:
    receiving at a first base station information associated with a plurality of frequency channels or subframes from one or more second base stations; and selecting one of the frequency channels or subframes for use by the first base station, wherein one or more of the frequency channels or subframes are used by the one or more second base stations and are given priority during the selection, the one or more second base stations non-adjacent to the first base station, wherein selecting one of the frequency channels or subframes comprises:

determining if any of the one or more frequency channels or subframes used by the one or more second base stations is acceptable;

selecting one of the acceptable frequency channels or subframes, when at least one of the one or more frequency channels or subframes used by the one or more second base stations is acceptable; and selecting one of the frequency channels or subframes that is not used by the one or more second base stations, when none of the one or more frequency channels or subframes used by the one or more second base stations are acceptable.

* * * * *